United States Patent Office 3,256,154
Patented June 14, 1966

3,256,154
HAIR WAVING COMPOSITION AND METHOD
Aubrey D. Jenkins and Leszek J. Wolfram, Silver Spring, Md., assignors to The Gillette Company, Boston, Mass., a corporation of Delaware
No Drawing. Filed Oct. 18, 1963, Ser. No. 317,143
5 Claims. (Cl. 167—87.1)

This invention is concerned with hair waving compositions and with the use of such compositions for hair waving.

We have found that water-soluble phosphine derivatives of the formula

(I)

where K is hydrogen or a substituent —$R_2X_2$, L is hydrogen or a substituent —$R_3X_3$, $R_1$, $R_2$ and $R_3$ are alkylene groups which may be the same or different, and $X_1$, $X_2$ and $X_3$ are polar substituents which confer water-solubility on the compound, are effective hair waving agents. The limiting factor upon the size of the alkylene groups, $R_1$, $R_2$, and $R_3$, i.e. the number of carbon atoms they contain, is the necessity for the compound to be water soluble; beyond a certain size of alkylene group the compounds will no longer be water soluble despite the solvating action of the X substituents. In general the alkylene groups should not contain more than 5 carbon atoms and preferably not more than 4; advantageously the R groups contain from 1 to 3 carbon atoms. The X groups may be any of a number of polar groups which confer water-solubility on compounds in which they are substituted and $X_1$, $X_2$ and $X_3$ may, for example, by hydroxyl —OH, amine —$NH_2$ or amide —$CONH_2$ and may be the same or different.

Of the various mono-, di- and tri-substituted phosphines falling within Formula I, the tri-substituted compounds in which $R_1X_1$, $R_2X_2$ and $R_3X_3$ are all the same are preferred. A particularly preferred compound is tris (hydroxymethyl) phosphine.

Instead of using these substituted phosphines as such, precursors therefor which are water-soluble may be used; suitable precursors are water-soluble salts of the formula

(II)

where K, L, $R_1$, and $X_1$ have the above-stated meanings, M is hydrogen or a substituent —$R_4X_4$, $R_4$ being an alkylene group and $X_4$ being a polar substituent which confers water-solubility, and Y is the anion of the salt. The considerations relating to the choice of $R_4$ and $X_4$ are the same as for $R_1$, $R_2$ and $R_3$ and $X_1$, $X_2$ and $X_3$ respectively as described above. It will be seen that Formula II includes both acid addition salts of the mono-, di- and tri-substituted phosphines of Formula I (i.e. the salts of Formula II in which M is hydrogen) and tetra-substituted phosphonium salts (i.e. the salts of Formula II in which M is —$R_4X_4$). Of the tetra-substituted phosphonium salts, those in which $R_1X_1$, $R_2X_2$, $R_3X_3$, and $R_4X_4$ are all the same are preferred.

The anion Y may be organic or inorganic and will, for convenience, be derived from a readily available acid. Chloride and acetate salts are conveniently used.

The tetra-substituted phosphonium salts are believed to dissociate in aqueous solutions to give, inter alia, the corresponding substituted phosphine compound. In the case of the preferred tetra-substituted phosphonium salt, tetrakis-(hydroxymethyl) phosphonium chloride, the dissociation is believed to take the form

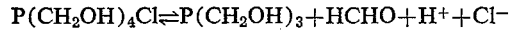

The degree of dissociation depends, inter alia, on the pH of the solution, the temperature and the concentration of the precursor.

Hair waving compositions containing the substituted phosphines or their precursors and ready for use essentially consist of an aqueous or aqueous alcoholic solution of one or more of these compounds together with a surface active agent, preferably a nonionic or anionic surface active agent. The nonionics are preferred when the composition is acidic. The compositions will normally contain, in addition, the ancillary constituents customarily present in hair waving compositions such as buffering agents, perfume, fats or waxes. In addition to compositions ready for use, the substituted phosphines or their precursors may be formulated in concentrated forms which are diluted with or added to water to make them suitable for use; thus these compounds may be formulated as a dry powder mix with ancillary constituents as mentioned above, also in dry powder form or as a viscous cream again in combination with ancillary constituents.

The concentration of substituted phosphine compound or precursor in hair waving compositions ready for use (referred to hereinafter, for simplicity, as hair waving compositions) may be varied over a wide range and suitable concentrations will depend primarily upon the temperature at which the composition is to be used. Thus the compositions may be used at room temperature (20–25° C.) and at temperatures up to 60° to 100° C., the latter temperatures being those employed in the hottest professional hair-waving processes. Room temperature and temperatures slightly above room temperature will normally be used by amateurs, i.e. home permanent waving. It is usually preferred that the hair waving compositions should contain at least 0.01 molar concentration of substituted phosphine compound and it is not usually necessary that the compositions should have more than 1.0 molar concentration. Within those upper and lower concentration figures, compositions for use at the higher temperatures need to contain less of the substituted phosphine compound than compositions for use at room temperature. Where a substituted phosphonium salt is employed instead of the substituted phosphine compound as such, the concentration of the salt should be that which will give the required concentration of the substituted phosphine compound. Since the phosphonium salts do not completely dissociate in solution, it will be appreciated that considerably larger concentrations of the salts are required in order to obtain substituted phosphine concentrations within the limits mentioned above.

The surface active agents present in the composition are preferably nonionic or anionic in character. Among the nonionic surface active agents suitable for use are the dialkylolamides of higher fatty acids containing from 10 to 18 carbon atoms such as lauric, myristic, stearic, etc.; the polyoxyalkylene ethers of higher fatty alcohols containing from 10 to 18 carbon atoms, such as lauryl, myristyl, stearyl, etc.; the alkylphenols in which the alkyl groups contain from 4 to 15 carbon atoms, for example octylphenol; and the like. Suitable anionic surface active agents include soaps, sulfated fatty alcohols, alkylaryl-sulfonates, salts of condensates of peptides with fatty acids, salts of condensates of taurides with fatty acids, and the like. The amount of the surface active agent may vary from 0.1% to 5% by weight of the total composition, including water, which is equivalent to 1% by weight up to many times the weight of the substituted phosphines or their precursors.

Satisfactory hair waving can be obtained with compositions having a pH as low as 2 and as high as 10 with both the substituted phosphines and their precursors.

However, since hair waving is promoted by swelling the hair and alkaline solutions have this effect, i.e., of swelling the hair, it is normally preferred to use alkaline compositions having a pH of from 7.5 to 9.5. The substituted phosphine compounds may be equally satisfactorily used at acidic or neutral pH's, but if such are employed, it is preferred to include a hair swelling agent, such as urea, in the composition. Although the substituted phosphonium salts can be used at acidic and neutral pH's, it is much preferred to use them at alkaline pH's as mentioned above as such pH's promote dissociation of the salt as well as swelling of the hair.

In most cases it is preferred to include a suitable buffering system in the composition in order to stabilize the pH; alkaline salts, such as sodium sesquicarbonate, water-soluble borates, and tertiary amines such as triisopropanolamine and triethanolamine are preferred.

The hair waving process may be carried out with compositions containing the substituted phosphines or precursors in the same way as with known hair waving compositions. After application of the hair waving composition to the hair, conventional oxidative neutralization may be employed (particularly where short processing time is required). Aqueous solutions of hydrogen peroxide, of per-salts, such as perborates and persulphates, and of water-soluble bromates, such as potassium bromate may be used for this purpose. Alternatively neutralization can be allowed to occur naturally over a period of time, for example overnight, by exposure to air.

As compared with known hair waving agents such as mercaptan and bisulphite compounds, the substituted phosphine compounds and their precursors have the advantage of being substantially free from objectionable odor and as it has been the smell of the known hair waving agents which has to some extent hindered consumer acceptance of hair waving compositions containing them, it will be appreciated that this is an important advantage. In addition hair waved using the substituted phosphines or their precursors in some cases appears to be less damaged and to have a greater sheen than hair waved with known hair waving agents. While for these reasons it may be preferred to use a substituted phosphine or its precursor as the sole hair waving agent in hair waving compositions, the former may be combined with known hair waving agents, such as mercaptans or bisulphites.

The following examples are given by way of illustration only (in these examples tetrakis-(hydroxymethyl) phosphonium chloride is referred to as THPC and tris (hydroxymethyl) phosphine as THP).

*Example 1*

A waving composition was prepared by dissolving THPC in distilled water to give a 1 molar solution and bringing it up to a pH of 9.5 by the addition of sodium hydroxide and sodium sesquicarbonate, then adding 1% by weight, based on the total weight of the composition, of the potassium salt of the condensation product of peptide with coconut fatty acid sold under the name Maypon 4–C. To test its waving efficacy, standard laboratory tresses made of natural, untreated human hair were shampooed, towel dried, saturated with the above solution and wrapped on permanent waving rods having a diameter of 0.165 inch. After 15 minutes the wrapped tresses were re-saturated with the solution and allowed to process 15 minutes more, after which they were thoroughly water rinsed. After 30 minutes' allowance for creep, the tresses were neutralized with a 1.5% aqueous solution of hydrogen peroxide. After another thorough rinsing, tresses were wrapped on styling rollers, allowed to dry and styled into conventional curls; a satisfactory result was obtained.

*Example 2*

A waving composition was prepared by dissolving THPC in distilled water to give an 0.7 molar solution and bringing it up to a pH of 8.5 by the addition of triisopropanolamine, then adding 1% by weight, based on the total weight of the composition, of triethanolamine lauryl sulfate. Laboratory hair tresses of the type described in Example 1 were saturated with the waving solution, wrapped on rods of 0.165 inch diameter, allowed to process 15 minutes, resaturated, allowed to process 15 minutes longer, and then rinsed. In place of oxidative neutralization of Example 1 this group of tresses was allowed to remain on the curling rods for 22 hours, thereby simulating an overnight processing time. At the end of this period the hair was shampooed, set and styled as above. The resulting wave, although not quite as tight, was nevertheless of a commercially acceptable style.

*Example 3*

A waving composition was prepared by dissolving THPC and sodium thioglycolate in distilled water to give a solution containing an 0.5 molar concentration of THPC and 1.0% of sodium thioglycolate, then adding 1% by weight, based on the total weight of the composition, of sodium N-coconut fatty acid N-methyl taurate. After bringing the solution to a pH of 9.2 by the addition of triethanolamine, laboratory tresses as described above were waved using the process of Example 1. The end result was substantially the same and significantly better than would have been the case had only the THPC or the sodium thioglycolate been used alone in the concentrations given above.

*Example 4*

A waving composition was prepared by dissolving THPC and sodium bisulphite in distilled water to give a solution containing an 0.25 molar concentration of THPC and 10% of sodium bisulphite, then adding 1% by weight, based on the total weight of the composition, of sodium dodecyl benzene sulfonate. After bringing the solution to a pH of 6.0 by the addition of sodium bicarbonate, laboratory tresses as described above were waved using the process of Example 2. As in the case of that example, the wave produced was somewhat weaker than is the case when chemical neutralization is employed. Nevertheless, a commercially acceptable, casual wave was obtained.

*Example 5*

An aqueous waving solution containing 0.1 molar THP and 1% by weight, based on the total composition, of ethoxylated (ten moles) octylphenol, only was prepared and was evaluated as a waving agent using the process of Example 1. Comparison of the waved tresses with both thioglycolate cold waved hair and tresses waved by the THPC-THP mixture of Example 1 showed that the THP tresses produced equivalent wave levels.

Although specific embodiments of the invention have been described herein, it is not intended to limit the invention solely thereto, but to include all of the obvious variations and modifications within the spirit and scope of the appended claims.

What is claimed is:

1. A method of waving human hair which comprises applying at room temperature a hair waving composition comprising a member of the class consisting of tris (hydroxymethyl) phosphine and tetrakis (hydroxymethyl) phosphonium chloride in a concentration of from 0.01 molar to 1.0 molar, and a surface active agent in an amount equal to at least 1% by weight of said member, said surface active agent being selected from the class consisting of nonionic and anionic agents.

2. A method of waving human hair which comprises applying at room temperature to suitably coiled hair a hair waving composition as described in claim 1 and subsequently effecting oxidative neutralization.

3. A method as claimed in claim 2 in which oxidative neutralization is effected with an aqueous solution of a member of the class consisting of hydrogen peroxide, a water-soluble per salt and a water-soluble bromate.

4. A method as claimed in claim 2 in which neutralization is effected by exposing the treated hair to air.

5. A method of waving human hair which comprises applying at room temperature a hair waving composition comprising tris (hydroxymethyl) phosphine in a concentration of from 0.01 molar to 1.0 molar, and a surface active agent in an amount equal to at least 1% by weight of said member, said surface active agent being selected from the class consisting of nonionic and anionic agents.

References Cited by the Examiner

UNITED STATES PATENTS

| | | | |
|---|---|---|---|
| 2,600,624 | 6/1952 | Zoppo | 167—87.1 |
| 2,732,278 | 1/1956 | Filachione | 8—94.33 |
| 2,836,643 | 5/1958 | Watson | 167—87.1 |
| 3,103,468 | 9/1963 | Shephard et al. | 167—87.1 |

FOREIGN PATENTS 169,458  11/1951  Austria.

OTHER REFERENCES

Chemical Abstracts, vol. 47; 5426e (1953).
Chemical Abstracts, vol. 53; 9727e (1959).
Sagarin: Cosmetics: Science and Technology, Interscience Publishers, New York, 1957, pp. 617–620.
Whewell: Journal of the Society of Cosmetic Chemists, vol. 12, No. 4, May 1961, pp. 207–223.

JULIAN S. LEVITT, *Primary Examiner.*

VERA C. CLARKE, *Assistant Examiners.*